(12) United States Patent
Yoscovich (10) Patent No.: US 11,063,528 B2
(45) Date of Patent: *Jul. 13, 2021

(54) GENERATING AN ALTERNATING-CURRENT VOLTAGE WITH A HIGH FREQUENCY MULTI-LEVEL INVERTER

(71) Applicant: Solaredge Technologies Ltd., Herzeliya (IL)

(72) Inventor: Ilan Yoscovich, Ramat-Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,159

(22) Filed: Mar. 20, 2018

(65) Prior Publication Data

US 2019/0068079 A1    Feb. 28, 2019

Related U.S. Application Data

(63) Continuation of application No. 13/826,556, filed on Mar. 14, 2013, now Pat. No. 9,941,813.

(51) Int. Cl.
*H02M 7/42* (2006.01)
*H02M 7/483* (2007.01)
*H02M 7/487* (2007.01)
*H02M 1/088* (2006.01)

(52) U.S. Cl.
CPC ............ *H02M 7/42* (2013.01); *H02M 7/483* (2013.01); *H02M 1/088* (2013.01); *H02M 7/487* (2013.01)

(58) Field of Classification Search
CPC ......... H02M 2007/4835; H02M 7/487; H02M 7/483; H02M 1/088
See application file for complete search history.

(56) References Cited

U.S. PATENT DOCUMENTS

| | | | | |
|---|---|---|---|---|
| 5,625,539 A | * | 4/1997 | Nakata | H02M 7/4807 363/132 |
| 5,973,368 A | * | 10/1999 | Pearce | H01L 21/8234 257/329 |
| 6,424,207 B1 | | 7/2002 | Johnson | |
| 8,472,221 B1 | * | 6/2013 | Lee | H02M 7/217 363/127 |

(Continued)

FOREIGN PATENT DOCUMENTS

| | | |
|---|---|---|
| CN | 1086259 C | 6/2002 |
| CN | 101902143 A | 12/2010 |

(Continued)

OTHER PUBLICATIONS

Boller, Optimale Ansteuerung von Mittelspannungswechselrichtern, Diss Uni Wuppertal, Nov. 11, 2011.

(Continued)

*Primary Examiner* — Kyle J Moody
*Assistant Examiner* — Lakaisha Jackson
(74) *Attorney, Agent, or Firm* — Banner & Witcoff, Ltd.

(57) ABSTRACT

A multi-level inverter having at least two banks, each bank containing a plurality of low voltage MOSFET transistors. A processor configured to switch the plurality of low voltage MOSFET transistors in each bank to switch at multiple times during each cycle.

24 Claims, 4 Drawing Sheets

(56) References Cited

U.S. PATENT DOCUMENTS

| | | | |
|---|---|---|---|
| 8,867,248 B2* | 10/2014 | Wang | H02M 7/487 363/132 |
| 8,937,822 B2 | 1/2015 | Dent | |
| 9,735,703 B2 | 8/2017 | Dent | |
| 10,128,774 B2 | 11/2018 | Dent | |
| 10,135,361 B2 | 11/2018 | Dent | |
| 10,666,161 B2 | 5/2020 | Dent | |
| 10,784,710 B2 | 9/2020 | Dent | |
| 2003/0043611 A1* | 3/2003 | Bockle | H05B 45/39 363/131 |
| 2005/0017656 A1* | 1/2005 | Takahashi | H05B 41/24 315/248 |
| 2011/0110136 A1* | 5/2011 | Lacarnoy | H02M 7/483 363/127 |
| 2011/0280052 A1* | 11/2011 | Al-Haddad | H02M 7/483 363/84 |
| 2012/0200163 A1 | 8/2012 | Ito et al. | |
| 2012/0217943 A1 | 8/2012 | Haddad | |
| 2013/0223651 A1* | 8/2013 | Hoyerby | H03F 3/2173 381/120 |
| 2016/0365731 A9 | 12/2016 | Dent | |
| 2017/0310242 A1 | 10/2017 | Kifuji et al. | |
| 2018/0026550 A1 | 1/2018 | Dent | |
| 2020/0028447 A1 | 1/2020 | Dent | |
| 2020/0059166 A1 | 2/2020 | Dent | |
| 2020/0412165 A1 | 12/2020 | Dent | |

FOREIGN PATENT DOCUMENTS

| | | |
|---|---|---|
| CN | 101944839 A | 1/2011 |
| CN | 102355152 A | 2/2012 |
| CN | 102511121 A | 6/2012 |
| CN | 202333835 U | 7/2012 |
| CN | 102624267 A | 8/2012 |
| CN | 102629836 A | 8/2012 |
| CN | 102651612 A | 8/2012 |
| CN | 102664514 A | 9/2012 |
| CN | 102763316 A | 10/2012 |
| CN | 102891602 A | 1/2013 |
| CN | 102959843 A | 3/2013 |
| CN | 102983002 A | 3/2013 |
| CN | 103518300 A | 1/2014 |
| CN | 103607107 A | 2/2014 |
| EP | 2882084 A3 | 7/2015 |
| EP | 2651024 A3 | 5/2017 |
| JP | 2010-220364 A | 9/2010 |
| JP | 2011-072118 A | 4/2011 |
| JP | 2011-130517 A | 6/2011 |
| JP | 2012-060735 A | 3/2012 |
| JP | 2012-065428 A | 3/2012 |
| JP | 2012-257451 A | 12/2012 |
| JP | 2013-055830 A | 3/2013 |
| JP | 2013-526247 A | 6/2013 |
| JP | 2013-258790 A | 12/2013 |
| JP | 2014-003821 A | 1/2014 |
| JP | 2014-050135 A | 3/2014 |
| WO | 0213364 A1 | 2/2002 |
| WO | 2011-093269 A1 | 8/2011 |
| WO | 2013005498 A1 | 1/2013 |
| WO | 2014042118 A1 | 3/2014 |
| WO | 2015120023 A1 | 8/2015 |

OTHER PUBLICATIONS

Choi, Capacitor Voltage Balancing of Flying Capacitor Multilevel Converters by Space Vector PWM, Jul. 2012.
Cramer, Modulorientierter Stromrichter Geht In Serienfertigung, SPVSE, 1994.
Cramer, String-Wechselrichter Machen Solarstrom Billiger, Elektronik, Sep. 1996.
Engler, Begleitende Untersuchungen zur Entwicklung eines Multi-String-Wechselrichters, SPVSE, Mar. 2002.
Feng, A Novel Voltage Balancing Control Method for Flying Capacitor Multilevel Converters, IEEE, 2003.
Feng, Modified phase-shifted PWM control for flying capacitor multilevel converters. IEEE Transactions on Power Electronics, 2007.
Fishelov, Immer Maximale Leistung, Elektronik, 2010.
Geipel, Untersuchungen zur Entwicklung modulorientierter Stromrichter für netzgekoppelte Photovoltaik-Anlagen, SPVSE, 1995.
Ghias, Voltage Balancing Method for the Multilevel Flying Capacitor Converter Using Phase-Shifted PWM, Dec. 2012.
Hu, Active Power Filtering by a Flying-Capacitor Multilevel Inverter with Capacitor Voltage Balance, IEEE, 2008.
Kang, A Symmetric Carrier Technique of CRPWM for Voltage Balance Method of Flying-Capacitor Multilevel Inverter, Jun. 2005.
Khazraei, A Generalized Capacitor Voltage Balancing Scheme for Flying Capacitor Multilevel Converters, IEEE, 2010.
Khazraei, Active Capacitor Voltage Balancing in Single-Phase Flying-Capacitor Multilevel Power Converters, IEEE, Feb. 2012.
Mcgrath, Analytical Modelling of Voltage Balance Dynamics for a Flying Capacitor Multilevel Converter, 2007.
Niebauer, Solarenergie Optimal Nutzen, Elektronik, 1996.
Schettler, Selbst Geführte pulswechselrichtemit Gleichspannungskreis Für den Einsatz in Hochspannungsnetzen zur Sicherung der Energiequoitlat mittals Wirk-und Blindleistun, Pulswechselrichter, VDI, 2004.
Shukla, Improved Multilevel Hysteresis Current Regulation and Capacitor Voltage Balancing Schemes for Flying Capacitor Multi-level Inverter, IEEE, Mar. 2008.
Zhang, Three-phase four-leg flying-capacitor multi-level inverter-based active power filter for unbalanced current operation, 2013.
Wang et al, Self-precharge of floating capacitors in a five-level ANPC inverter, Proceedings of The 7th International Power Electronics and Motion Control Conference, 1776-1780, Jun. 2012.
Janik et al, Universal precharging method for de-link and flying capacitors of four-level Flying Capacitor Converter, 6322-6327, 2013.
Mar. 5, 2020—CN Office Action—CN 201811175971.4.
Dec. 18, 2020—CN Office Action—CN 201910798978.X.

* cited by examiner

GENERATING AN ALTERNATING-CURRENT VOLTAGE WITH A HIGH FREQUENCY MULTI-LEVEL INVERTER

This application is a continuation of U.S. patent application Ser. No. 13/826,556 filed Mar. 14, 2013, titled "High Frequency Multi-Level Inverter." The above priority application is incorporated herein by reference.

BACKGROUND

Despite many years of research, the search for a more cost-effective inverter implementation (either single phase or three phases) has thus far has been elusive. Some attempts utilize high voltage switches (e.g. 600V IGBTs) in a topology that is aimed at reducing switching losses and/or the size of passive components (mainly magnetics). See, for example, "Multilevel inverters: A survey of Topologies, Control and Applications". These inverters, which are aimed at reducing switching losses typically include high voltage switches (e.g. 600V IGBTs) that switch at a frequency around ×10 of the line frequency (50 Hz) or up to 16 kHz. The IGBT switching losses are considerable at this range of frequencies and even at the low end of these frequencies. Further, the low frequency switching causes the choke to approach or exceed 20% of the overall cost of the inverter. Alternative research has sought to use even more advanced switch technology (e.g., Silicon Carbide and/or Galium Nitride) in order to increase frequency and reduce the size of passive components. This research can reduce switching losses to some extent as well but only at the high cost of the advanced switch technology. Despite extensive research, these inverter topologies offer only limited improvements and cannot achieve the cost reduction and efficiencies needed for efficient inverter technologies.

There remains a need for a low cost, high efficiency inverter technology.

SUMMARY

The following summary is for illustrative purposes only, and is not intended to limit or constrain the detailed description.

Embodiments herein may employ a multi-level inverter (e.g., a single phase and/or three phase inverters) with a specialized control system which enables low cost inverters with a high efficiency. In some embodiments discussed herein, a multi-level inverter may be utilized where the output of the inverter (before filtering) has several voltage steps thereby reducing the stress on the magnetics of the inverter and improving the output voltage shaping which allows further reduction in switching frequency.

In exemplary multi-level inverters (either single phase or three phase) described herein, the control system allows the use of low-voltage MOSFETs (e.g. 80V) in order to form an equivalent switch of higher voltage (e.g. using six 80V MOSFETs resulting in an equivalent 480V switch). The conduction and switching characteristics of the low voltage switching multi-level inverter are substantially and unexpectedly improved over other multi-level inverter implementations. In these embodiments, by staggering the turning on and off of the low voltage MOSFETs, a lower frequency modulation may be utilized for each of the multi-level switches, e.g., each of the MOSFETs may be switched at a moderate frequency (e.g. 200 kHz) while maintaining low switching losses compared to other switch technologies and gaining the benefits of an effective frequency of 200 kHz*N where N is the number of switches in series that are staggered in time, thereby reducing the size requirements of the passive parts according to the effective extended frequency. In some embodiments, the MOSFETs may be switched in at staggered times according to a duty cycle ratio (which may or may not change according to the sine-wave), where each MOSFET is shifted by, for example, ⅙ of the switching period (for examples with 6 MOSFETs in a series).

In accordance with embodiments discussed herein, in addition to the advantages with respect to conduction and switching losses discussed herein, these examples offer other major benefits such as the reduction of passive components (e.g., in the main choke magnetics and/or output filter). For example, due to the multi-level voltages and low cost MOSFET switches, a reduction in size and/or cost by a factor of N (e.g. 6 in the example) can be achieved. In addition, exemplary embodiments discussed herein can achieve an effective frequency within the main choke which may be N times the switching frequency (e.g. 6*200 kHz in this example). As a result, in these embodiments, the main choke can be smaller by a factor of N^2 (e.g. 36) relative to a standard design. In embodiments described herein, the overall gain factor in the main choke size relative to a standard IGBT-based inverter system utilizing 16 kHz switching frequency may be, for example, 200 kHz/16 kHz*36=450, rendering the cost of the choke to be so small that it becomes almost negligible in multi-level inverter examples described herein. A similar calculation can be made for the output filter showing even greater advantage in reduction in cost and increases in efficiencies.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
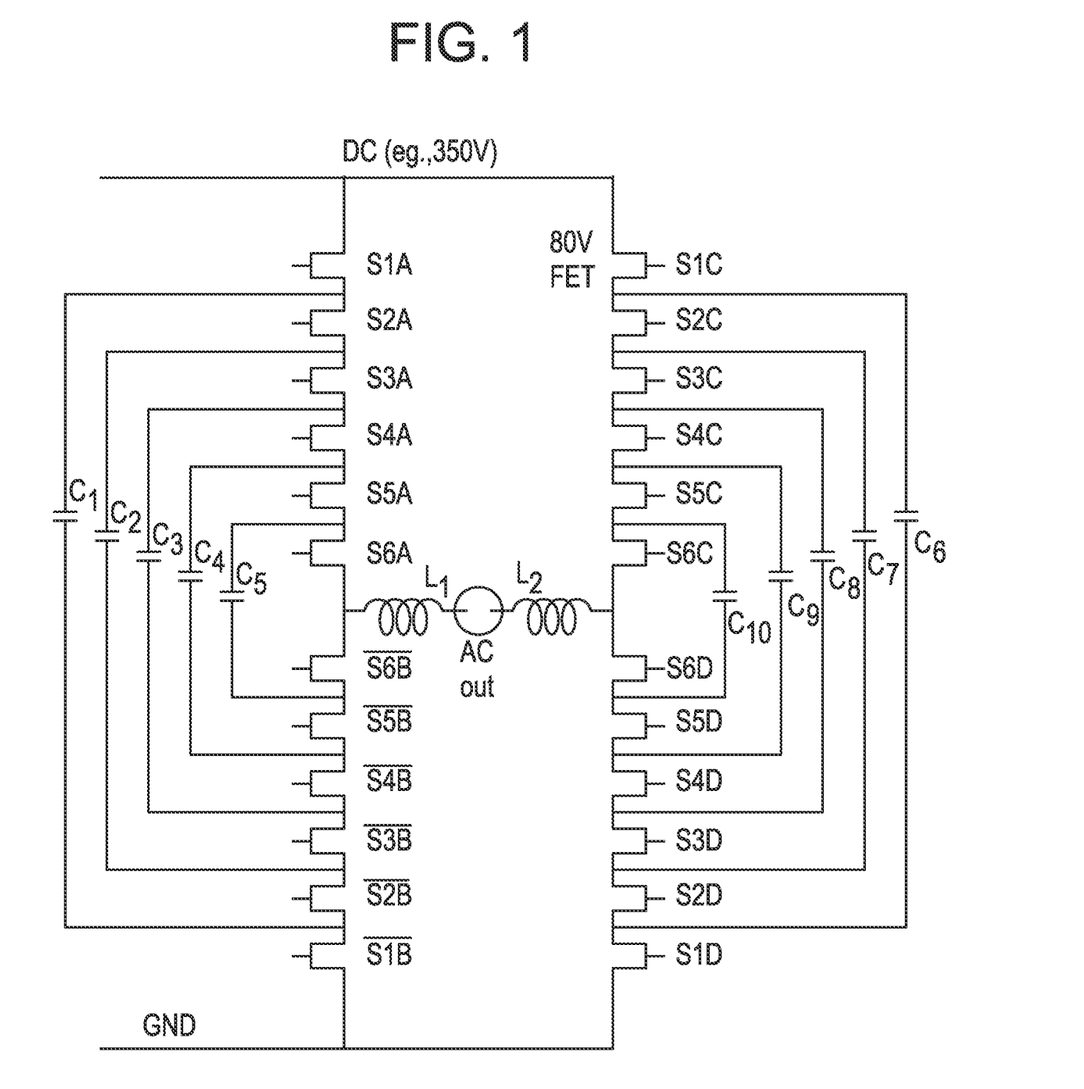
FIG. 1 illustrates an example multi-level inverter in accordance with embodiments herein.
Figure 2:
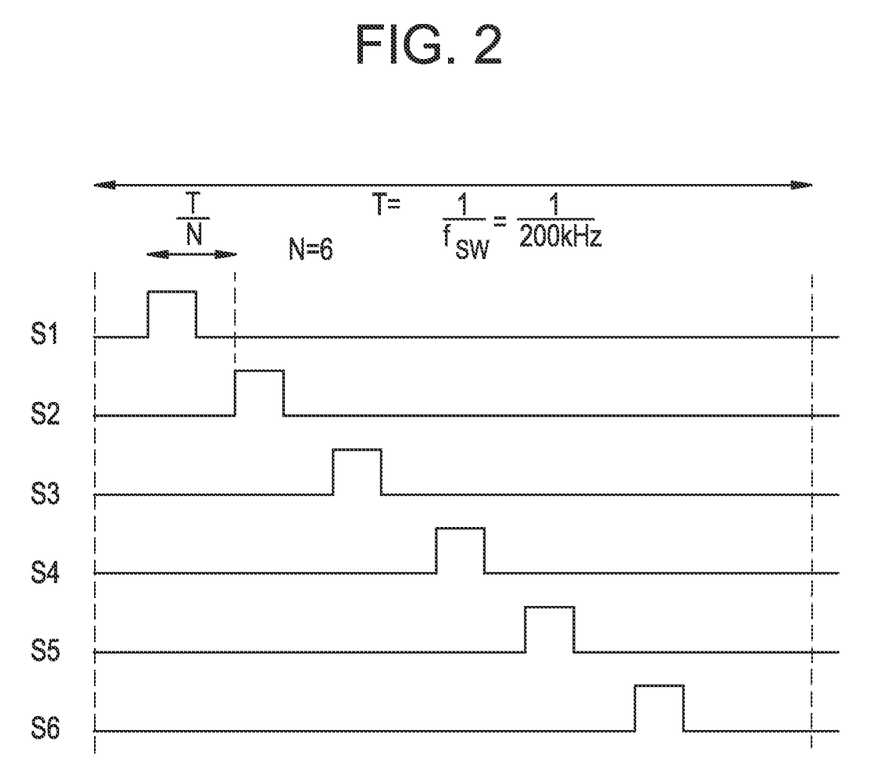
FIG. 2 illustrates an algorithm for controlling the multi-level inverter in accordance with embodiments herein.

Referring to FIG. 1, an exemplary multi-level inverter includes one, two, or more parallel connections each comprising a plurality of different switches located disposed across a DC voltage. The switches may be coupled to a number of capacitors and/or inductors which may be utilized to smooth a sine-wave of an AC output of the inverter. For example, a plurality of switch banks S1A-S6A, S6B-S1B, S1C-S6C, and/or S6D-S1D may be disposed in any suitable configuration such as that shown in FIG. 1. Each of the banks of MOSFET transistors may be variously configured to include two, three, four, five, six, seven, eight, nine, ten, eleven, twelve or more transistors. Referring to FIG. 2, each of the switches may be controlled by an output from a processor 10 (e.g., logic, one or more processor(s), controls, state machine, controller, microprocessor, software driven control, gate array, and/or other controller). In this embodiment, switch bank A comprises a series of FET transistors S1A-S6A (e.g., 20 v, 40 v, 60 v, 80 v, 100 v, 120 v MOSFET transistors) connected together in, for example, a source to drain configuration to form a first switching bank; switch bank B comprises a series of FET transistors S1B-S6B (e.g., 20 v, 40 v, 60 v, 80 v, 100 v, 120 v MOSFET transistors) connected together in, for example, a source to drain configuration to form a second switching bank; switch bank C comprises a series of FET transistors S1C-S6C (e.g., 20 v, 40 v, 60 v, 80 v, 100 v, 120 v MOSFET transistors) connected together in, for example, a source to drain configuration to form a third switching bank; switch bank D comprises a series of FET transistors S1D-S6D (e.g., 20 v, 40 v, 60 v, 80 v, 100 v, 120 v MOSFET transistors) connected together in, for example, a source to drain configuration to form a fourth switching bank. While six 80 volt FET transistors are used for each switch bank in this example, either more and/or less transistors can be utilized with different voltages e.g., 20 v, 40 v, 60 v, 80 v, 100 v, 120 v. For example, where 12 transistors are utilized in each switching bank, the voltages across those transistors may be adjusted to a suitable voltage such as 40 volts and the switching frequency of the transistors within one cycle may be increased from the example where only 6 transistors are utilized (e.g., switching each transistor at twice the rate).

Referring to FIG. 2, each of the MOSFETs may be controlled to switch using a high frequency (e.g. around 200 kHz in this example) while still having low switching losses compared to other switch technologies. As shown in FIG. 2, for this example, the MOSFETs are switched according to the duty cycle ratio (which changes according to the sine-wave) in the following simple manner (shown for six MOSFETs in series), where each MOSFET is shifted by ⅙ of the switching period.

In addition to the conduction and switching losses advantages discussed above, another major benefit of the embodiment shown in FIGS. 1-2 is the reduction of passive components (e.g., main choke and output filter sizes). Due to the multi-level voltages, a factor of N (e.g. 6 in the example) can be reduced in size/cost. In addition, the effective frequency within the main choke is N times the switching frequency (e.g. 6*200 kHz in this case). The result of embodiments in accordance with this example is that the main choke can be smaller by a factor of N^2 (e.g. 36) relative to a standard design using 200 kHz. Since usual inverters use much smaller switching frequencies (e.g. 16 kHz) due to limitations of the 600V switches, the overall gain in the main choke size is 200 kHz/16 kHz*36=450 which makes it negligible while in a standard inverter it is about 20% of the size and cost of the inverter. A similar calculation can be made for the output filter showing even greater advantage.

Embodiments of the present invention switch at a higher frequency (e.g., 50 kHz, 100 kHz, 150 kHz, 200 kHz, 250 kHz, 300 kHz or even higher), and the manner in which the switches are modified in accordance with, for example, FIG. 2. The gain in accordance with inverters of the present examples gain a factor of n squared. This unusual result is achieved in part by switching only one component at a time instead of switching all of them in one cycle. Using low voltage MOSFETs, it is possible to switch all of the switches in the same output voltage cycle while still achieving comparatively low switching losses which allows further gains and efficiencies.

Usually about 20% of both size and cost of an inverter are related to the main choke. In embodiments described herein, increasing the frequency by, for example, 15 kHz and increasing the number of switches to 6 can result in an additional gain factor of 36 because of the multi-level components. In these embodiments, the cost of the main choke can be as little as one percent or even less than that of the overall inverter cost. In addition, because of switching method described herein, the inverter will be much more efficient and also the production of the output voltage will be much better which gains substantial efficiency. It means that the enclosure and the inverter can be dimensionally much lower and therefore a much smaller and cheaper enclosure can be used. The size and cost of the enclosure is reduced both because of reduction of the main choke, reduction in the filter, and because of improved efficiency, which provides a smaller and more compact enclosure.

The control shown in FIG. 2 has been demonstrated to have substantial efficiencies over conventional control circuits. For example, the control illustrated in FIG. 2 allows the switches S1A-S6A, S6B-S1B, S1C-S6C, and S6D-S1D to be switched all within one period, in this embodiment with the switching of switches in one bank to be offset as shown in FIG. 2. In these embodiments, the switches operate six times higher than other control mechanisms.

Referring to FIG. 1, an inverter is typically comprised of two halves with symmetry on each side of the inverter. In the embodiment of FIG. 1, there are 4 banks of six switches each for 24 switches which operate at a lower voltage (e.g., 80V) and a higher frequency (e.g., 200 kHz). The higher frequency switching allows staggered switching of each switch in each bank (e.g., all six switches) in one cycle, which is six times faster than conventional modulators.

For voltage, where the absolute voltage is around 350V (which may be a voltage received from a DC source such as a bank of solar panels), this voltage may be utilized to produce an AC voltage of, for example, 230V. The switching elements in each bank when coupled with the capacitors C1-C5 and C6-C10 may be switched such that the voltages across switching banks A and B and switching banks C and D may sum to a voltage of approximately 350 V in this example. Because the voltage across any one switch can be much lower than 350 V because the voltage is spread over each of the switch/capacitor combinations, the voltage of the switches can be much smaller (e.g., 350 divided by 6 which or around 60V). This voltage can be made lower and/or higher depending upon the number of switches in each bank.

Referring to FIG. 2, the switches may be configured to switch all during the same cycle. For example, the switches may each be switched at, for example, 200 kHz. This allows each switch to turn "on" for a predetermined period such as ½₀₀ kHz or around 5 microseconds, during which time each switch turns on and off. In a conventional multi-level inverter, only one switch will switch at one cycle of one of the 16 kHz. However, in embodiments described herein, the low voltage MOSFETs may be switched at a much higher rate (e.g., 200 kHz) and additionally all of the switches in one bank may be switched during the same period. This example effectively increases the speed to 6 times the switching period, without actually increasing the switching frequency. Further, the design is scalable in that it can be increased more and more by adding more transistors to the switching banks; the multi-level switching in each bank allows the switching to increase in frequency without driving the MOSFET faster (e.g., six times faster).

This is an advantage of multi-level inverters in the examples herein in that you can switch six, eight, ten, twelve, or more times faster depending on the number of MOSFETs in a series in each switching bank. One advantage associated with certain embodiments, is that it is possible to switch 6, 8, 10, 12, or more times faster by switching all of the MOSFETs during the same period, without actually switching any one of the MOSFETs faster than the original speed. This is a structural advantage cannot be achieved in inverters today because the switching ability of conventional designs cannot achieve this result. By controlling the control switches to operate in accordance with FIG. 2, it is possible to super charge a multi-level inverter to switch all the switches during the same cycle time and thus achieve an effective frequency of, for example, six times higher without actually switching any of the switches (e.g., MOSFETs) at a higher frequency.

Because of the higher switching frequency in accordance with the present embodiments, in addition to a smaller choke, the capacitors between the switches will be smaller. This is part of the size and cost reduction. Additionally, the inductors L1 and L2 are also made smaller. In general, there are many components that shrink by going to a higher frequency, which is being increased, also by the factor of 36.

Figure 3:
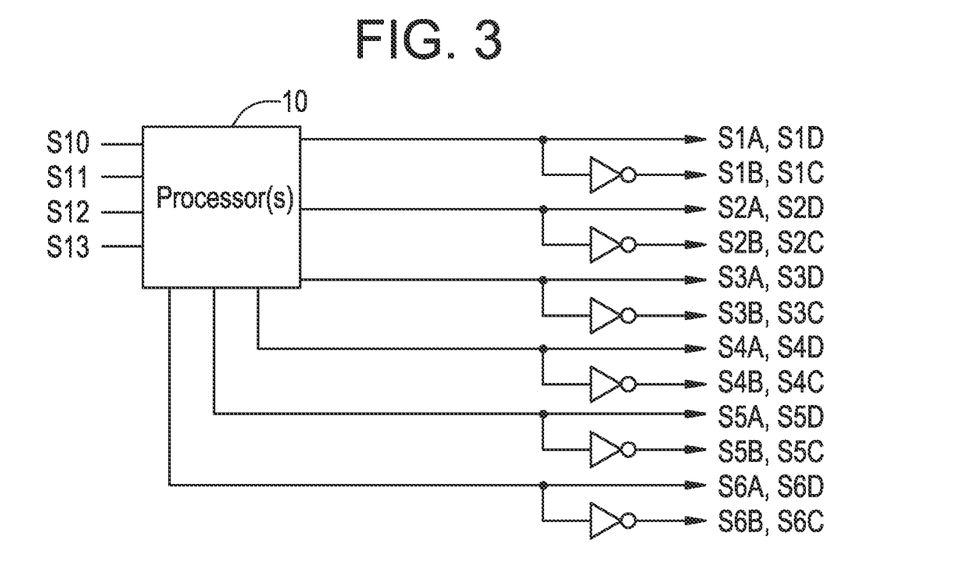
FIG. 3 illustrates an exemplary control for embodiments herein.

Again referring to FIGS. 2-3, the control into S1A-S6A is inverted from the control input into switches S1B-S6B (e.g., when S1A is closed, S1B is open). With respect to switches S1C-S6C, the control inputs to these switches are inverted from the control inputs to switches S1A-S6A (e.g., when S1A is closed, S1C is open). With respect to switches S1D-S6D, these switches have the same control input as those of switches S1A-S6A (e.g., when S1A is closed, S1D is closed). While the processor needs to control 24 switches, because banks A and D receive the same six control signals and banks B and C receive the opposite six control signals, it is possible to have only six output control signals input respectively to each of S1A-S6A and S1D-S6D and the inverse of these six control signals sent to S1B-S6B and S1C-S6C.

In these embodiments, S1C-S6C are inverted and S1D-S6D are not inverted with respect to the control input signal. Further, S1A-S6A are not inverted and S1B-S6B are inverted. Thus, 24 switches may be controlled with only six different control outputs from the processor. See, for example, the exemplary control structure shown in FIG. 3.

Various alternate embodiments may also be employed. For example, referring to FIG. 4, an alternate embodiment is shown which includes a single leg of multi-level MOSFETs that may be configured to generate a rectified sine-wave by performing DC/DC operation (buck) during a sine-wave cycle. In this embodiment, the output of the leg may be inverted by a low-frequency full-bridge operated at AC line frequency (50 Hz).

With this variation, the switching losses at the high-frequency are reduced by a factor of two relative to a full-bridge implementation and the conduction losses are a combination of the single multi-level leg and the slow-switching full-bridge. It is possible to reduce the conduction losses of the slow-switching full-bridge by using improved components (e.g Super-junction MOSFETs or a series-stack of low-voltage MOSFETs) while not increasing switching losses due to low switching frequency.

Another benefit of this variation is that the component cost may be further reduced since there is only one multi-level leg with all the drivers and balancing capacitors and the full-bridge components can be made much cheaper than the cost of another multi-level leg.

Again referring to FIG. 4, the output of the high frequency stage is a rectified sine-wave (e.g., whenever the sine-wave is positive, it is the same, whenever the sine-wave is negative, it's still positive). The high frequency stage may be configured to generate a sine-wave but it is always positive. The low frequency stage inverts the rectified sine-wave to positive and negative, to create a true sine-wave. The low-frequency stage may be configured to invert the signal whenever it is needed. In this embodiment, the low frequency stage has a number of switches such as four switches S10, S11, S12, S13. In this example, the positive cycle of the sine-wave can be achieved by having the top-left S10 and bottom right S11, switching to on. When the other half of the signal is processed, the control can switch on the other diagonal, e.g., the upper right switch S12 and the bottom left switch S13 to invert the signal completing a sine-wave. These switches may be controlled via a processor such as processor 10 shown in FIG. 3.

The use of MOSFETs for the first high frequency stage controlled as discussed herein in order to shape the rectified sine-wave is another example of the invention. The advantages discussed above with respect to FIGS. 1-3 can be achieved in the embodiment of FIG. 4 with only 16 switches as opposed to the 24 switches of FIG. 1. Thus, substantial advantages can be achieved and further reduced costs and components.

Figure 5:
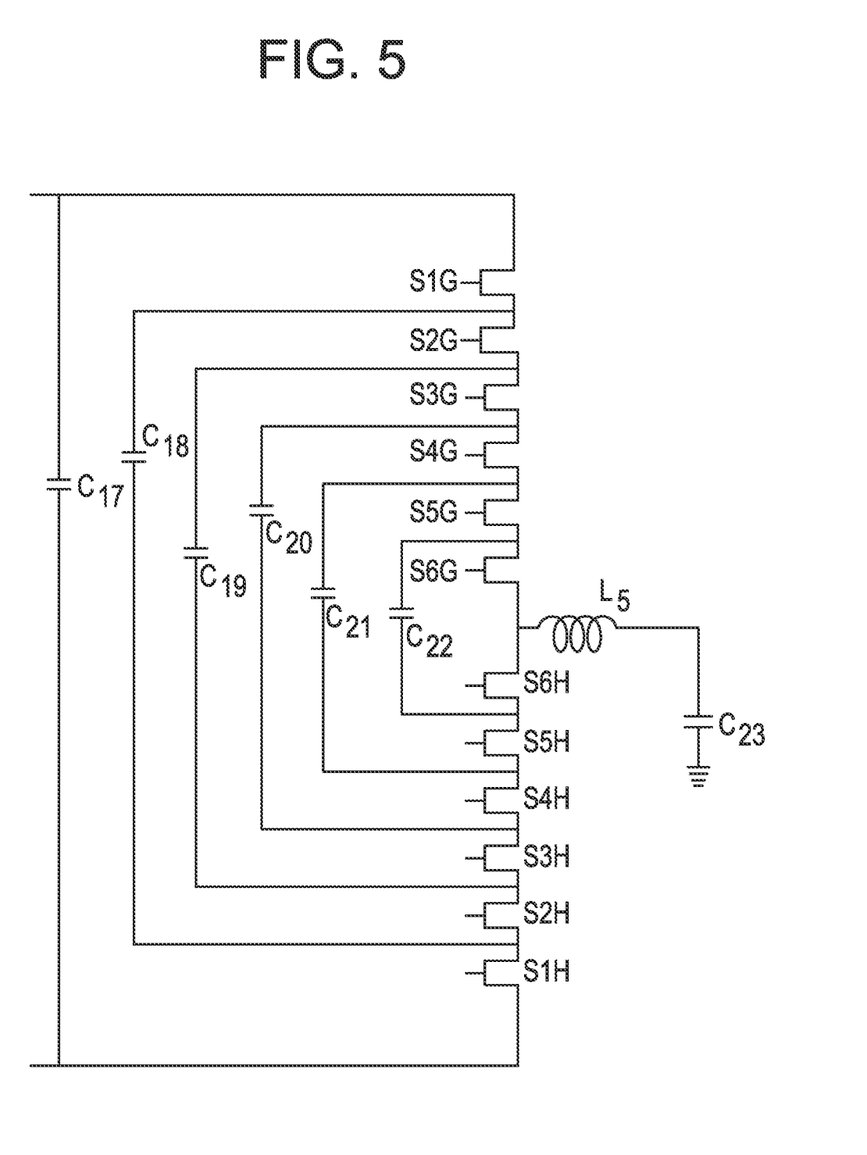
FIG. 5 illustrates still another example of a multi-level inverter in accordance with embodiments herein.

Still another embodiment is shown in FIG. 5. In the embodiment of FIG. 5, S1G-S6G and S6H-S1H and C17-C22 operate above as discussed with respect to FIGS. 1-3. In this embodiment, a single phase inverter adds an additional multi-level leg at the input of the inverter. In other words, the circuit of FIG. 5 may replace C1 of FIG. 1 and be connected across the 350 v input. The additional leg may be configured to act to transfer capacitive charge between the DC link capacitor (C17) and the storage capacitor (C23) in order to compensate for the low frequency pulsation, such as a low frequency pulse of around 100 Hz. Since the storage capacitor may be configured to fluctuate with full voltage swing, its size can be reduced considerably relative to the original size of C1. The size of C17 can be very small.

This type of solution for reducing the DC link capacitor C17 when implemented using multi-level topology with low-voltage MOSFETs as shown can be very efficient (0.2% losses) and therefore reduce both size and cost without a high impact on the performance.

In FIG. 5, the capacitor C17 on the input takes the difference between the output power and the input power. The input power is DC and the output power is AC. The output power is fluctuating and the DC power does not fluctuate because it is DC. Some capacitors absorb over/under power in view of sine-wave fluctuations. Usually, the input capacitor, on such an inverter is very big and can be 10 percent of the cost of the inverter. With respect to the embodiment shown in FIG. 5, instead of having a very big capacitor which is C17, using this embodiment, C17 can be very small and actually performing DC to DC conversion between C17 and C23 due to the low power MOSFETs and control switching topology discussed herein. For example, whenever there is too much power on the AC side, then C17 needs to provide more power, then it takes it from C23 and whenever there is too much power on the DC side, then C17 gives that redundant power to C23. So, everything is going back and forth between C17 and C23. But eventually it compensates for the difference between the DC power and the AC power. By using the techniques described herein of low-voltage multi-level component with the associated control, embodiments gain the ability to reduce the capacities of the input of the inverter.

Figure 4:
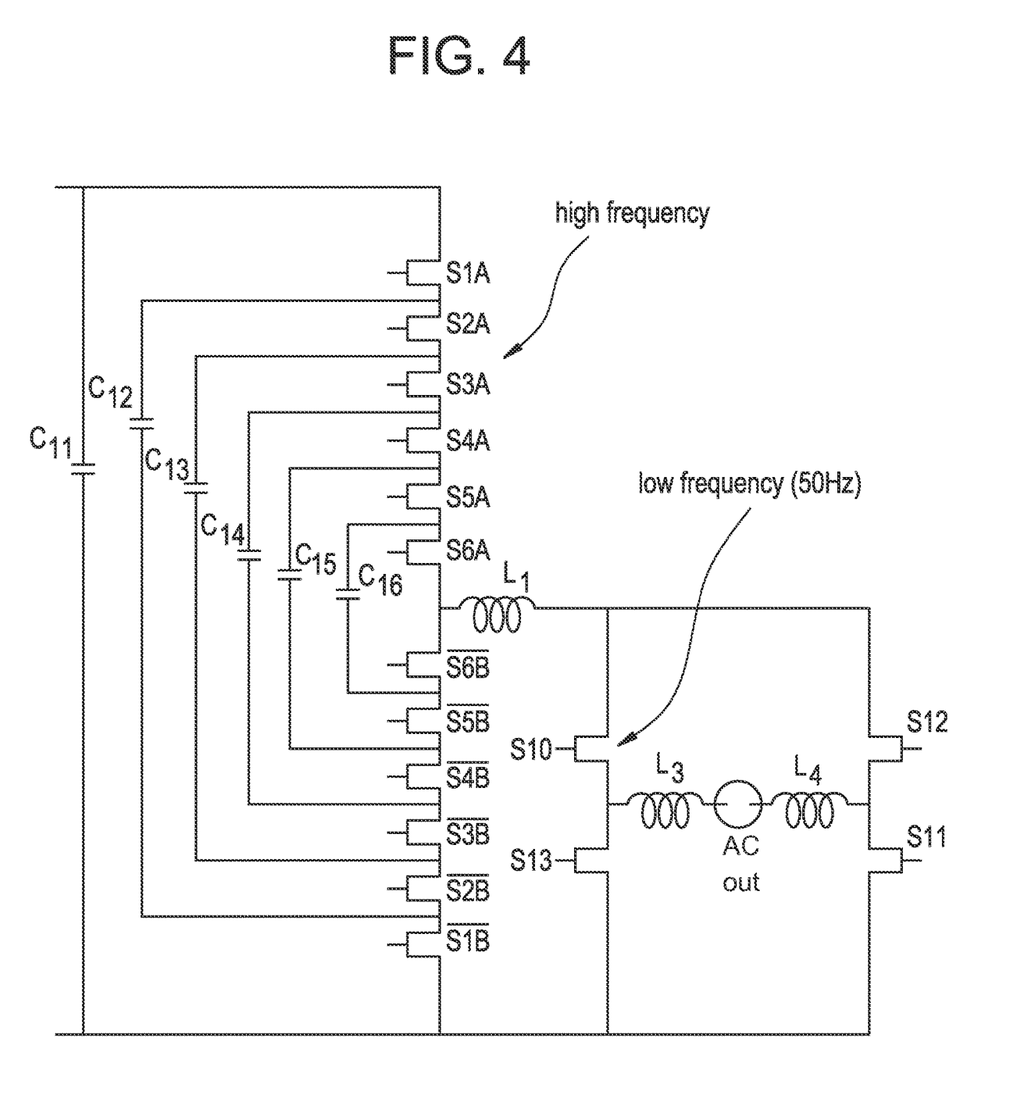
FIG. 4 illustrates another example of a multi-level inverter in accordance with embodiments herein.

In still further embodiments, the capacitor C1 of FIG. 1 can be replaced with the circuit shown in FIG. 5. Similarly, the capacitor C11 of FIG. 4 can be replaced with the circuit shown in FIG. 5. Instead of having a capacitor C1 and/or C11 as the case may be, some embodiments may replace these capacitors with the circuit of FIG. 5. With these examples, the modified FIG. 1 would now have 36 MOSFETs as opposed to 24 MOSFETs, but the very large capacitor C1 is no longer present. Similarly, for the example where FIG. 4 is modified, the circuit would have 24 MOSFETs as opposed to 12 MOSFETs, but the large capacitor C11 is no longer present. Thus, the circuit shown in FIG. 5 can serve as replacement for the capacitor on the left-hand side of FIG. 1 (C1) and/or for a replacement for the capacitor shown on the left-hand side of FIG. 4 (C11).

In still further embodiments, such as three phase embodiments, there may be more banks of MOSFET transistors. For example, referring to FIG. 1, there may be additional banks of MOSFET transistors S1E-S6E and S1F-S6F and associated capacitors. These MOSFET transistors would be controlled in the same manner as the other legs and transistor banks discussed herein. In this example, instead of just two legs shown in FIG. 1, one on the left and one leg on the right, you may have three legs similarly configured.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
generating, from a direct-current voltage, an alternating-current voltage having an alternating-current power line frequency by:
switching, in a single-phase multi-level inverter, at a second frequency and at different times, each transistor of a first plurality of low voltage MOSFET transistors in a first bank; and
switching, in the single-phase multi-level inverter, each transistor of a second plurality of low voltage MOSFET transistors in a second bank with substantially same phase and substantially opposite duty cycle as a respective transistor of the first plurality of low voltage MOSFET transistors of the first bank, wherein the first and the second banks are connected in series, and wherein the second frequency is greater than the alternating-current power line frequency.

2. The method of claim 1 wherein the switching of each transistor of the first plurality of low voltage MOSFET transistors in the first bank includes switching at different times more than three low voltage MOSFET transistors of the first plurality of low voltage MOSFET transistors.

3. The method of claim 1, wherein the switching of each transistor of the first plurality of low voltage MOSFET transistors in the first bank comprises turning on any one of the first plurality of low voltage MOSFET transistors in the first bank time-spaced from turning on another of the first plurality of low voltage MOSFET transistors in the first bank.

4. The method of claim 1, further comprising switching each transistor of the first plurality of low voltage MOSFET transistors with a duty-cycle-ratio that varies according to a phase of the alternating-current voltage.

5. The method of claim 1, further comprising:
controlling each of the first plurality of low voltage MOSFET transistors at staggered times during each cycle of the second frequency;
controlling each of a second plurality of low voltage MOSFET transistors in a second bank of the single-phase multi-level inverter at the staggered times during each cycle of the second frequency;
controlling each of a third plurality of low voltage MOSFET transistors in a third bank of the single-phase multi-level inverter at the staggered times during each cycle of the second frequency; and
controlling each of a fourth plurality of low voltage MOSFET transistors in a fourth bank of the single-phase multi-level inverter at the staggered times during each cycle of the second frequency;
wherein the first bank is connected between a first direct-current terminal and a first node, the second bank is connected between a second direct-current terminal and the first node, the third bank is connected between the first direct-current terminal and a second node, and the fourth bank is connected between the second direct-current terminal and the second node.

6. The method of claim 5, further comprising:
controlling the first, the second, the third, and the fourth banks to generate the alternating-current voltage across first and second alternating-current terminals connected to the first and the second nodes, respectively.

7. The method of claim 6, wherein the controlling of the first, the second, the third, and the fourth banks to generate the alternating-current voltage comprises:
switching each transistor of the first, the second, the third, and the fourth pluralities of low voltage MOSFET transistors with duty-cycle-ratios that vary according to a phase of the alternating-current voltage.

8. The method of claim 6, further comprising filtering the alternating-current voltage with a first inductor connected between the first node and the first alternating-current terminal, and a second inductor connected between the second node and the second alternating-current terminal.

9. The method of claim 5, further comprising controlling each transistor of the first plurality of low voltage MOSFET transistors with:
substantially same phase and substantially opposite duty cycle as a respective transistor of the third plurality of low voltage MOSFET transistors; and
substantially same phase and substantially same duty cycle as a respective transistor of the fourth plurality of low voltage MOSFET transistors.

10. The method of claim 5, further comprising
generating a first plurality of control signals, a second plurality of control signals, a third plurality of control signals, and a fourth plurality of control signals, wherein each control signal of the second and third pluralities of control signals are substantially inverted to a respective one of the first plurality of control signals, and wherein each control signal of the fourth plurality of control signals is substantially the same as a respective one of the of the first plurality of control signals;

controlling each transistor of the first plurality of low voltage MOSFET transistors with one of the first plurality of control signals;

controlling each transistor of the second plurality of low voltage MOSFET transistors with one of the second plurality of control signals;

controlling each transistor of the third plurality of low voltage MOSFET transistors with one of the third plurality of control signals; and controlling each transistor of the fourth plurality of low voltage MOSFET transistors with one of the fourth plurality of control signals.

11. The method of claim 1, wherein the alternating-current voltage is a sine wave, the alternating-current power line frequency is 50 Hz or 60 Hz.

12. The method of claim 1, wherein the alternating-current voltage is constant and the second frequency is between 16 kHz and 150 kHz.

13. The method of claim 12, wherein the direct-current voltage is above 120 V.

14. The method of claim 12, comprising generating the alternating-current voltage at 230 V.

15. The method of claim 1, comprising receiving the direct-current voltage from solar panels.

16. An apparatus comprising a multi-level inverter comprising:
first and second banks each comprising a plurality of low voltage MOSFET transistors; and
a controller circuit configured to generate, from a direct-current voltage, an alternating-current voltage at an alternating-current power line frequency by:
switching each transistor of the plurality of low voltage MOSFET transistors in the first bank at staggered times and at a second frequency that is greater than the alternating-current power line frequency, and
switching each transistor of the plurality of low voltage MOSFET transistors in the second bank with substantially same phase and substantially opposite duty cycle as a respective transistor of the plurality of low voltage MOSFET transistors of the first bank.

17. The apparatus of claim 16, wherein the alternating-current voltage is a sine wave, the alternating-current power line frequency is 50 Hz or 60 Hz, and the second frequency is in between 16 kHz and 150 KHz.

18. The apparatus of claim 17, wherein each transistor of the plurality of low voltage MOSFET transistors of each of the first and the second banks is rated for 20, 40, 60, 80, 100, or 120 volts.

19. The apparatus of claim 16, wherein the controller circuit is configured to switch each transistor of the plurality of low voltage MOSFET transistors of each of the first and the second banks with a duty-cycle-ratio that varies according to a phase of the alternating-current voltage.

20. The apparatus of claim 16, further comprising:
first and second direct-current terminals;
a first multi-level leg including the first and the second banks, wherein the first bank is connected between the first direct-current terminal and a first node, and the second bank is connected between the second direct-current terminal and the first node; and
a second multi-level leg including third and fourth banks, wherein the third bank is connected between the first direct-current terminal and a second node, and the fourth bank is connected between the second direct-current terminal and the second node.

21. The apparatus of claim 20, further comprising first and second alternating-current terminals, wherein the first node is connected to the first alternating-current terminal and the second node is connected to the second alternating-current terminal.

22. The apparatus of claim 20, further comprising:
first and second alternating-current terminals;
a first inductor connected between the first node and the first alternating-current terminal; and
a second inductor connected between the second node and the second alternating-current terminal.

23. The apparatus of claim 20, wherein the controller circuit is configured to switch each transistor of the plurality of low voltage MOSFET transistors of the first bank with:
substantially same phase and substantially opposite duty cycle as a respective transistor of a plurality of low voltage MOSFET transistors of the third bank; and
substantially same phase and substantially same duty cycle as a respective transistor of a plurality of low voltage MOSFET transistors of the fourth bank.

24. The apparatus of claim 20, wherein:
the controller circuit is configured to generate a first plurality of control signals and a second plurality of control signals, wherein each of the second plurality of control signals is substantially inverted to a respective one of the first plurality of control signals;
each transistor of the plurality of low voltage MOSFET transistors in the first bank, and each transistor of the plurality of low voltage MOSFET transistors in the fourth bank, is configured to switch according to a respective one of the first plurality of control signals; and
each transistor of the plurality of low voltage MOSFET transistors in the second bank, and each transistor of the plurality of low voltage MOSFET transistors in the third bank, is configured to switch according to a respective one of the second plurality of control signals.

* * * * *